US012146771B2

(12) United States Patent
Thorburn (10) Patent No.: US 12,146,771 B2
(45) Date of Patent: Nov. 19, 2024

(54) ROTARY POSITION ENCODER BASED ON POLARIZATION

(71) Applicant: Novanta Corporation, Bedford, MA (US)

(72) Inventor: William G. Thorburn, Danvers, MA (US)

(73) Assignee: Novanta Corporation, Bedford, MA (US)

( * ) Notice: Subject to any disclaimer, the term of this patent is extended or adjusted under 35 U.S.C. 154(b) by 69 days.

(21) Appl. No.: 17/571,958

(22) Filed: Jan. 10, 2022

(65) Prior Publication Data

US 2022/0221311 A1    Jul. 14, 2022

Related U.S. Application Data

(60) Provisional application No. 63/135,076, filed on Jan. 8, 2021.

(51) Int. Cl.
*G01D 5/34*      (2006.01)
(52) U.S. Cl.
CPC ................... *G01D 5/345* (2013.01)
(58) Field of Classification Search
CPC ........ G01D 5/345; G01D 5/344; G01B 11/26; G01B 11/002; G01B 11/14; G01J 4/00
See application file for complete search history.

(56) References Cited

U.S. PATENT DOCUMENTS

| | | | | |
|---|---|---|---|---|
| 3,474,255 A | * | 10/1969 | White | G01D 5/345 |
| | | | | 359/490.02 |
| 5,247,176 A | * | 9/1993 | Goldstein | G01J 4/00 |
| | | | | 356/367 |
| 6,816,261 B2 | * | 11/2004 | Patel | G01J 4/04 |
| | | | | 356/369 |
| 7,777,879 B2 | | 8/2010 | Baxter et al. | |
| 8,526,005 B1 | * | 9/2013 | Mason | G02B 26/06 |
| | | | | 359/489.07 |
| 8,546,744 B2 | | 10/2013 | Yoshida et al. | |
| 9,976,947 B1 | * | 5/2018 | Hoffer, Jr. | G01B 11/002 |
| 10,082,521 B2 | | 9/2018 | Atlas et al. | |

(Continued)

FOREIGN PATENT DOCUMENTS

| | | | | |
|---|---|---|---|---|
| CN | 109990736 B | | 9/2020 | |
| EP | 2843374 A1 | * | 3/2015 | ............. G01B 11/14 |
| KR | 20230004108 A | * | 1/2023 | ............. G01B 11/26 |

*Primary Examiner* — Mohamed K Amara
(74) *Attorney, Agent, or Firm* — BainwoodHuang (57) ABSTRACT

A rotary optical position encoder includes a source of a linear-polarized light beam, a polarization-sensitive detector, and a rotating retarder disposed for rotation between the source and the detector. The retarder is configured and operative to produce a polarized exit beam whose polarization state rotates at a rate greater than a rotation rate of the retarder, thereby for increased resolution over a similar encoder using a rotating polarizer element. In an example, when polarized light is incident upon a rotating half-wave retarder, the transmitted beam's polarization axis rotates at twice the rate of retarder rotation, resulting in an electrical detector output that varies four times per revolution. Resolution is improved accordingly, as a given detected increment at the output is produced by only one-half the physical rotation increment required for a simple polarizer.

25 Claims, 9 Drawing Sheets

(56) References Cited

U.S. PATENT DOCUMENTS

| | | | |
|---|---|---|---|
| 10,133,188 B2* | 11/2018 | Jak | G03F 7/70191 |
| 2005/0002032 A1 | 1/2005 | Wijntjes et al. | |
| 2015/0097111 A1* | 4/2015 | Hopp | G01D 5/345 |
| | | | 427/125 |
| 2017/0003372 A1* | 1/2017 | Antoina | G01S 17/66 |
| 2017/0108528 A1* | 4/2017 | Atlas | G01P 13/025 |
| 2018/0095174 A1* | 4/2018 | Mertz | G01B 11/002 |
| 2019/0181950 A1* | 6/2019 | Ishimura | H04B 10/079 |
| 2020/0378757 A1* | 12/2020 | Kimura | G01B 9/02019 |

* cited by examiner

ROTARY POSITION ENCODER BASED ON POLARIZATION

BACKGROUND

The invention is related to the field of rotary optical position encoders.

SUMMARY

In one aspect, a rotary optical position encoder is disclosed that includes a source of a linear-polarized light beam and a polarization-sensitive detector. The encoder further includes a rotating retarder disposed for rotation between the source and the detector. The retarder is configured and operative to produce a polarized exit beam whose linear polarization state rotates at a rate greater than a rotation rate of the retarder, thereby providing for increased resolution over a similar encoder using a rotating polarizer element. In an example, when polarized light is incident upon a rotating half-wave retarder, the transmitted beam's polarization axis rotates at twice the rate of retarder rotation, resulting in an electrical detector output that varies four times per revolution. Resolution is improved accordingly, as a given detected increment at the output is produced by only one-half the physical rotation increment required for a simple polarizer.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview A rotary position encoder based on linear polarization of light is described. Arrangements for increasing resolution with rotating retarders are described, as well as techniques for generating coarse bits which identify repeat cycles of polarization variation within one rotation. A hybrid polarization-based, grating-based encoder is also described.

The disclosed apparatuses and techniques provide a means of encoding rotary position with a device that is easily installed and aligned, compact in size, absolute in its position output, insensitive to radial runouts, largely insensitive to axial runout, and suitable for both on-axis and off-axis applications. They can increase polarization-based rotary encoder resolution and simplify the generation of coarse bits needed for 360-degree absolute operation.

Rotary encoders based on rotating radial grating patterns have been in use. They achieve high resolution but work off-axis which requires relatively large size. They are also generally sensitive to radial and axial bearing and scale runouts. These undesirable sensitivities are due to grating-based encoders essentially being linear encoders wrapped into a ring shape; i.e., they operate as linear encoders but the scale's grating is driven by rotary means. So, they are sensitive to translations when the only motion intended for detection is rotation. The problem is that they are translation transducers. The invention described herein is a true rotation transducer. Since it works on-axis it is compatible with small, compact clusters of axes without the risk of interference suffered by most magnetic encoders in close proximity to other axes. This invention provides higher resolution and smaller size than basic polarization-based encoders.

The disclosed encoder may be well suited for surgical robot applications, especially where multiple axes of motion are clustered in compact groups, and may also be suited for use as position feedback integrated into miniature motors.

B. Overview of Major Aspects of Invention

Several improvements are described, being generally independent although some may be used together. The description is arranged into four parts or sections as follows:

Part 1. Techniques/features for improving resolution
Major examples—use of wave retarders; multiple multiplexed sources (LEDs)

Part 2. Techniques/features for realizing coarse track
Major examples—sinusoidal coarse track; graded intensity variation Part 3. Techniques/features for applications—Sector (or "one bit") detection
Various examples of one-bit sensing techniques Part 4. Techniques/features for applications—packaging and arrangement alternatives
Examples—combined rotary/linear sensor; multi-axis sensor

DESCRIPTION OF EMBODIMENTS

Part 1—Techniques/Features for Improving Resolution In a first aspect, a polarization-based position encoder uses half-wave and/or quarter-wave retarders to increase resolution by a factor of 2, 4, or more.

A basic polarization encoder consists of a light source, a rotating polarizer, a stationary polarizer (or polarizer array) and a detector (or detector array) followed by amplifiers and processing electronics. As the first polarizer rotates, the axis of linear polarization of a transmitted beam rotates with it. The second polarizer (or array of polarizers) transmits light according to the angle between the rotating polarization plane of the input beam and the angle of the optical polarization axis of each stationary polarizing element. When the rotating plane of polarization is aligned with (parallel to) the axis of the stationary polarizing element, transmission is high; when the rotating plane is perpendicular to the axis of the stationary polarizing element, transmission is low. The transmission varies sinusoidally as a function of the polarizer's rotation angle according to Malus's Law. The detector (or detector array) senses this variation of incident light power and generates a correspondingly varying electrical output. In this way, a rotating linear polarizer results in two cycles of sinusoidal electrical variation for each revolution of the polarizer.

Resolution can be increased by using a rotating retarder in place of a simple rotating polarizer. When polarized light is incident upon a rotating half-wave retarder, the transmitted beam's polarization axis rotates at twice the rate of retarder rotation, resulting in an electrical output that varies four times per revolution. Resolution is improved accordingly, as a given detected increment at the output is produced by only one-half the physical rotation increment required for a simple polarizer.

Figure 1:
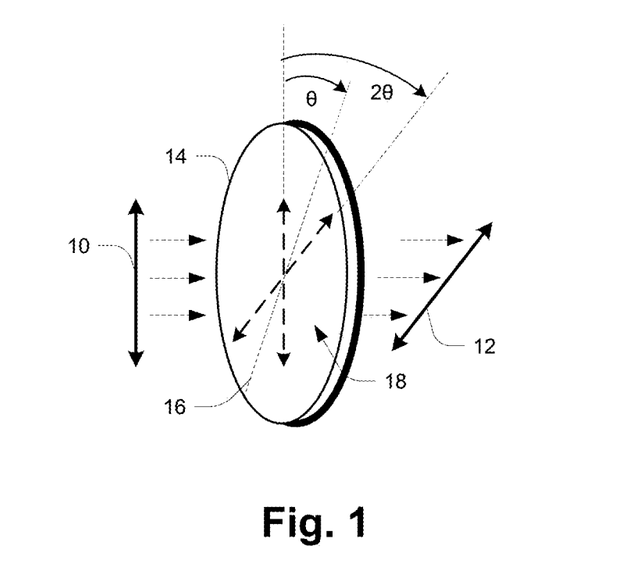
FIG. 1 is a schematic illustration of operation of a transmissive half-wave retarder.

FIG. 1 is a schematic illustration of a technique employing a retarder used to drive a polarization axis at twice the rotational rate of a polarizer, thereby improving detection resolution by a factor of two. Shown in FIG. 1 is a first axis 10 of linear polarization of an input beam of light, a second axis 12 of linear polarization of an output or exit beam, and a rotating half-wave retarder 14 having a so-called "fast" axis 16. Also shown are projections 18 of the input and output polarization axes 10, 12 onto the retarder 14, for illustrating angle relationships in a common plane. Generally, as the retarder 14 rotates while the input beam polarization 10 stays constant, the polarization axis 12 of an exit beam rotates at twice the rate of the retarder 14. FIG. 1 captures this operation under conditions in which the fast axis 16 is at a first angle θ relative to the input axis 10, and the output axis 12 is at a second angle 20 as shown.

The retarder 14 alters the speed and wavelength (not frequency) of one component of the input beam, so that as the light emerges out the other side one component has been relatively retarded in phase (by 180 degrees in a half-wave retarder), causing the plane of linear polarization to rotate to the other side of the fast axis 16 of the retarder 14. Thus, as the retarder 14 is rotated relative to the axis 10 of input beam polarization, the axis 12 of the output beam polarization rotates at twice the rate of the retarder 14. This behavior can be employed in a polarization-based encoder to increase resolution by a factor of two over the more basic approach of using a simple polarizing disk rather than a retarder 14.

Figure 2:
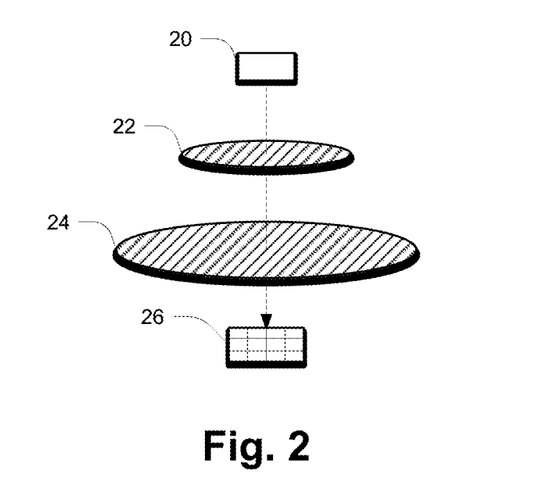
FIGS. 2 through 5 are schematic diagrams of linear-polarization-based optical encoders according to corresponding arrangements.

FIG. 2 shows a rotary encoder having a light source 20 (e.g., LED) that generates a beam that passes through a stationary polarizer 22 and a rotating retarder 24 before reaching a polarization-sensitive detector 26. The detector 26 may be realized as a polarizer array followed by a distinct detector array, or alternatively as a detector array with integrated polarizer array. The beam from the source 20 need not be collimated if the optical components have sufficiently wide angular acceptance ranges. The use of an array 26 for the final polarizer and detector allows for sampling through rotationally phased elements that provide multiple parallel samples, such as four phased push/pull signals of a 4-bin process as is generally known in the optical encoder art. In the 4-bin case, there are four distinct polarization axes represented in the detector array 26, rotated at 45-degree increments relative to each other, i.e., 0-degree, 45-degree, 90-degree, and 135-degree polarizing elements (see FIG. 9 for example). The resulting signals vary sinusoidally, phased in quadrature, as functions of the rotation angle of the rotating retarder 24. From these samples the rotation angle of the retarder 24 can be determined, with the angular position information being absolute within each full cycle of variation.

In the arrangement of FIG. 2, the source 20 and stationary polarizer 22 function together to produce a polarized beam that is made incident on the retarder 24. This configuration generally assumes that the source 20 is of a type that produces non-polarized light, such as an LED. In alternative arrangements, the source 20 may be a laser or other source that produces polarized light, in which case the stationary polarizer 22 may not be required. This aspect of the arrangement of FIG. 2 also applies to other arrangements described below that utilize a polarized beam incident on a retarder or similar optic.

More specifically, the detector array 26 is responsible for detecting polarization angle in a range of 0 to 180 degrees, and a conventional multi-bin detection scheme does so partly by detecting at four positions of 0, 45, 90 and 135 degrees and treating the detector outputs as corresponding sine-function signals (sin, cos, −sin, −cos), which are then combined trigonometrically to yield an angle estimate. Other schemes may be used including a 3-bin process, typically arranged as 0, 60 and 120 degrees. It would also be possible to use only two detector phases or even one, with supplemental mechanisms as need, but such alternatives are not elaborated herein and may not be practical commercially.

As mentioned, a polarization-based encoder will generally need an additional mechanism to provide most-significant position information. For example, a basic polarization encoder requires a mechanism for the most significant bit of position, to differentiate between the two half-cycles of a complete 360-degree rotation of the polarizer. A retarder-based encoder, as in FIG. 1 or 2, needs a mechanism for one or more additional bits. For example, since a half-wave retarder provides four cycles of output for every full cycle of revolution, it is necessary to provide two additional most-significant bits of sensing. In this description, the term "sector" is used to refer to a rotational section in which the polarizer provides full position information, and accordingly the additional mechanism that identifies a specific section (e.g., half-cycle as above) is referred to as a "sector sensor". In the example of a half-wave retarder producing a 2× polarization rate, the sector size is a quadrant (90-degree arc), and thus the sector sensor must distinguish among the four quadrants of a full 360-degree rotation.

Although the above describes use of a half-wave retarder, other configurations are possible. In another specific example, a quarter-wave retarder may be used in reflection (e.g., a transmissive quarter-wave retarder with a reflective surface behind it) to drive the polarization axis around at twice the rate a rotating polarizer would, thereby generating four cycles of output variation in response to one cycle of rotation of the retarder. In this case the sector size is one quarter cycle, so the sector sensor must distinguish among the four quarter-cycle sectors of a full revolution.

Figure 3:
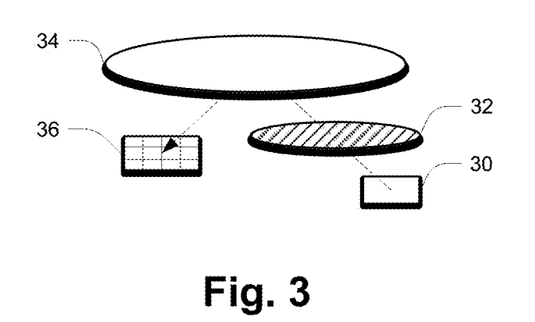

FIG. 3 shows an example arrangement in which the optical encoder includes a light source 30, a stationary polarizer 32, a reflective retarder 34 and a polarization-sensitive detector 36. The retarder 34 may be realized as a quarter-wave transmissive retarder with a reflective coating on its distal surface (uppermost in this view), or alternatively using a separate stationary mirror. Operationally, the result is similar as for a half-wave retarder in transmission, because two passes through the quarter-wave retarder 34 provide net half-wave retardation that rotates the axis of polarization at twice the rate of rotation of the retarder 34. The reflective configuration provides for a more compact assembly and requires electronics only on one side of the rotating element. The reflective surface on the far side of the quarter-wave retarder 34 can be stationary (e.g., a separate stationary mirror) or rotate with the retarder such as when the reflection is achieved by the addition of a reflective coating on the second surface of the retarder. Note that no sector sensor is shown in FIG. 3.

Figure 4:
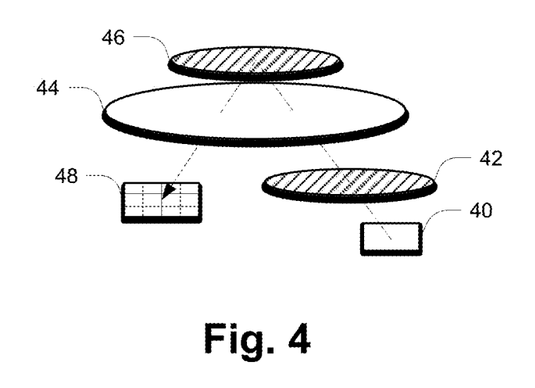

FIG. 4 illustrates another arrangement using a series of retarders to further increase cycles per revolution (cycles/rev) and therefore the encoder resolution. In this arrangement a light source 40 and stationary polarizer 42 supply a polarized incident beam, and a rotating half-wave retarder 44 is used in transmission followed by a stationary quarter-wave retarder 46 operating in reflection, similar to the retarder 34 of FIG. 3. This arrangement is a two-pass system in which the plane of polarization is rotated at three successive places—first by half-wave retarder 44 for the incident beam, second by the quarter-wave retarder 46 (similar to that of FIG. 3), and third by the half-wave retarder for the reflected beam, thus generating eight cycles of sinusoidal variation per revolution. Again, no sector sensor is shown.

Figure 5:
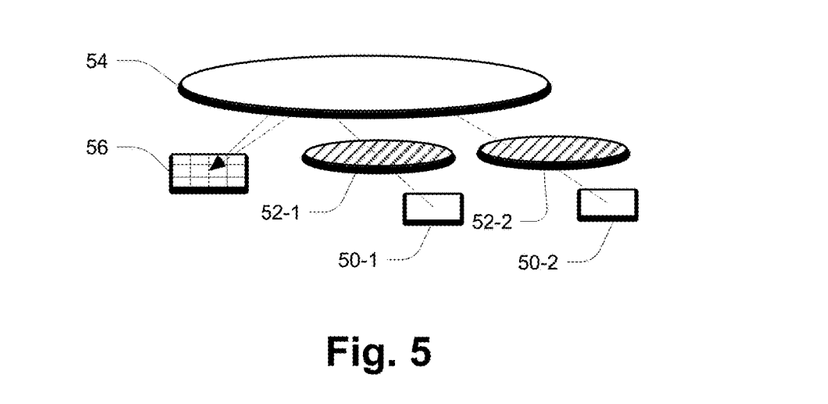

FIG. 5 shows an optical encoder using multiple multiplexed sources for increased resolution. A polarization-based optical encoder may include two or more sources 50-1, 50-2, each with their own polarizer 52-1, 52-2, with the beams transmitting through or reflecting from a rotating retarder 54 and illuminating the same polarization-sensitive detector 56. The polarizers 52 at the sources 50 could be rotated with respect to each other for relative phase shifting. The sources 50 are multiplexed to generate phase shifted sines and cosines that are interpolated, and then these phase-shifted interpolated outputs are logically combined (XOR) to increase the resolution. FIG. 5 shows a reflective configuration; a transmissive configuration may be used instead. The sources 50 could be fabricated as an array, as could the polarizers 52 over each of the sources 50.

Figure 6:
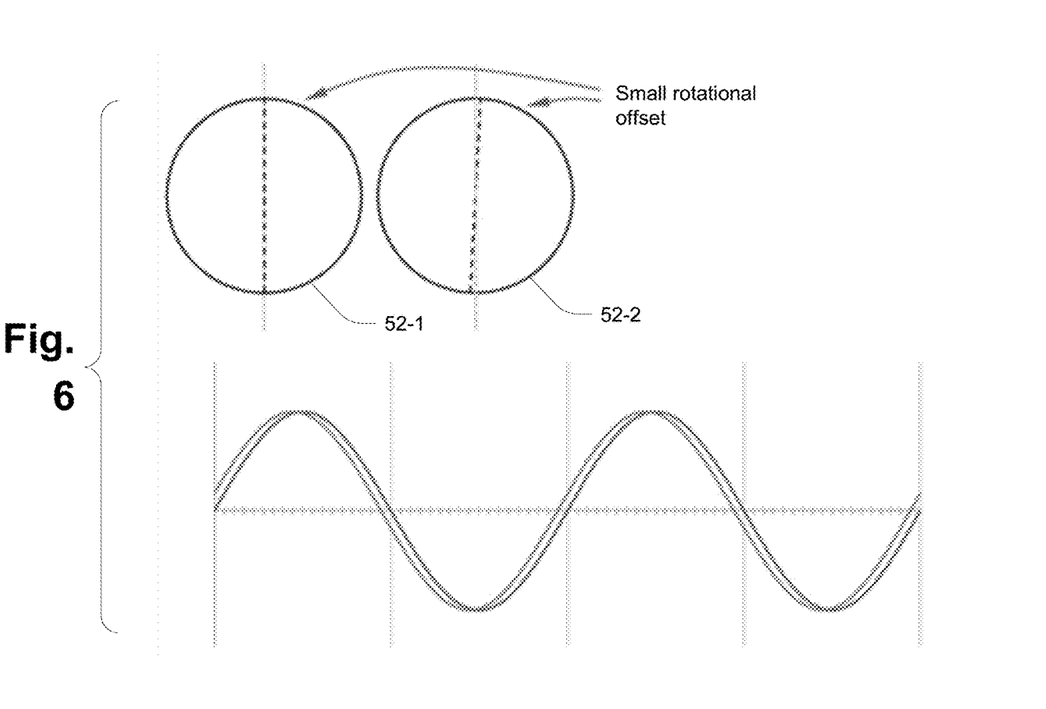
FIG. 6 illustrates the use of small rotational offsets in the optical encoder arrangement of FIG. 5.

FIG. 6 illustrates that the polarizers 52-1, 52-2 over the light sources 50-1, 50-2 have a small rotational alignment difference (offset), so that the directions of linear polarization of the output light beams are rotationally skewed with respect to each other, causing a corresponding small phase shift between the resulting sinusoidal signals, as shown in the waveform plot at the bottom.

The multiplexed arrangement may be extended to more than two multiplexed channels to further increase resolution.

Figure 7:
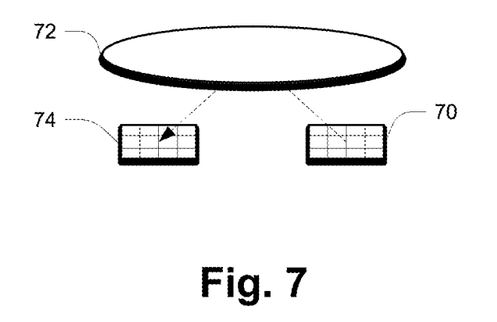
FIGS. 7-10 are schematic illustration of linear-polarization-based optical encoders according to corresponding arrangements.

FIG. 7 shows an arrangement incorporating an additional polarizer to increase resolution. Resolution is increased without the need for a retarder, by using a source array 70 pairing polarizers with multiple light sources, one rotating polarizer 72, and a detector array 74 having a polarizer over each individual detector (e.g., photodiode). Individual light sources (e.g., LEDs) within the source array 70 are multiplexed along with the corresponding individual detectors of the detector array 74. The polarizers at the source array 70 are rotationally phased with respect to each other to generate multiple phases, e.g., four phases. The polarizer array design at the detector 74 matches that of the above encoder configurations, and the polarizers at each of the individual sources (in source array 70) are aligned to be perpendicular to the corresponding polarizer elements at the detector array 74. As the rotating polarizer 72 rotates through 360 degrees, four cycles of variation are sensed at each of the four sets of detectors.

Figure 8:
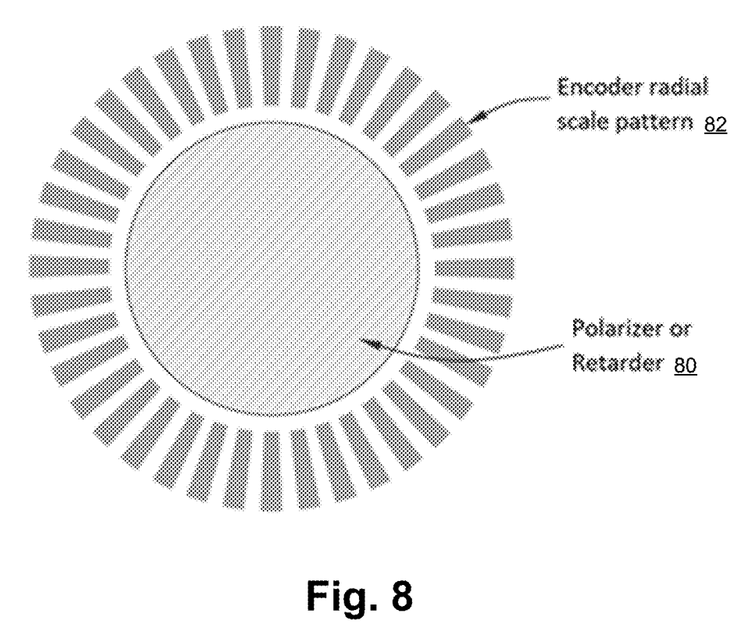

FIG. 8 shows an optical encoder that combines grating and polarization elements in an integrated manner. It includes a polarization optic 80 (polarizer or retarder) and a radial scale pattern 82 as shown. A polarization-based sensor (sub-encoder) uses polarization optic 80 and a corresponding polarization-sensitive detector (not shown), with or without a separate sector sensor, to generate the more significant bits, while the less significant bits (the high-resolution bits) come from a grating-based sub-encoder using the scale pattern 82 and corresponding grating-sensitive detector (not shown). The bits of the two sensors (sub-encoders) are linked together for a full position indication over a sector. Low-harmonic position errors (including eccentricity) can be mapped from the polarization sensor, while high-harmonic accuracy can be derived from the grating-based sensor.

The polarization-based part of this encoder may use a retarder as described above or just use a polarizer as the rotating polarization optic. The grating-based portion of the encoder could use a Talbot sensor or other scale sensing technology. The grating-based and polarization-based sensors may be integrated into one sensing assembly.

Part 2—Techniques/Features for Realizing Coarse Track

Figure 9:
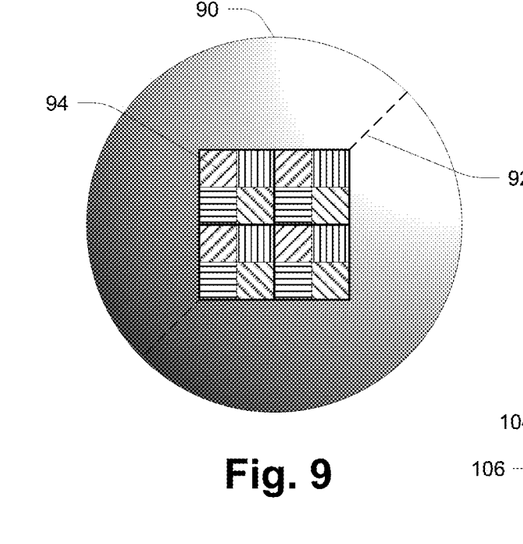

FIG. 9 shows an arrangement using a graded intensity variation across a rotating polarizer 90 to realize the sector sensor.

To reduce the overall size of a polarization-based encoder, the sector sensor can be integrated directly into the rotating polarizer 90, such as by forming either a transmission graded variation across the face of the polarizer 90 or a reflectivity graded variation of reflection across a mirrored/reflective polarizer 90. In FIG. 9 the variation occurs unidirectionally along an optical axis 92 of the polarizer 90. This example includes a polarization-sensitive detector array 94 having four separate regions, with each region having four individual polarizers and detectors, one for each of the four phases. The sums of amplified outputs of the four detectors within each of the four sections varies in a once-per-revolution fashion as the polarizer 90 is rotated, with the sum from each section varying in quadrature with respect to the sums of the other sections.

Figure 10:
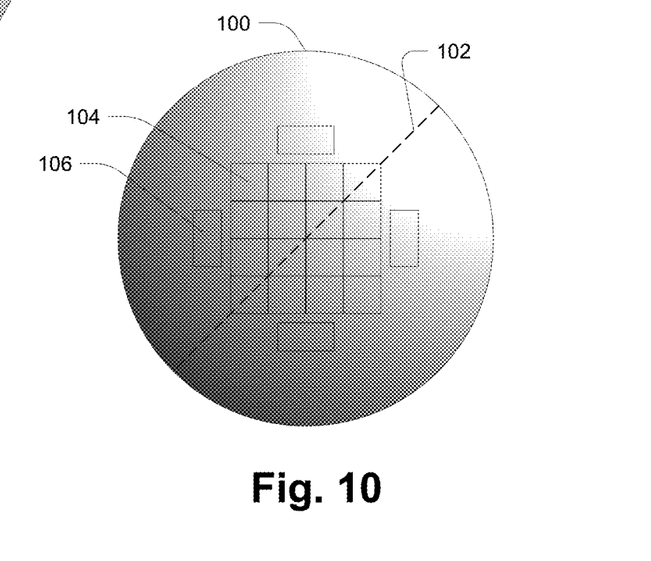

FIG. 10 shows an alternative approach for extracting the sector identification from the detector array that is used to sense the signals from the polarizer, namely one in which separate photodiodes 106 are formed on the same detector chip as the detector array 104 (alternatively, discrete photodiodes could be used and placed in close proximity to the detector array chip).

Figure 11:
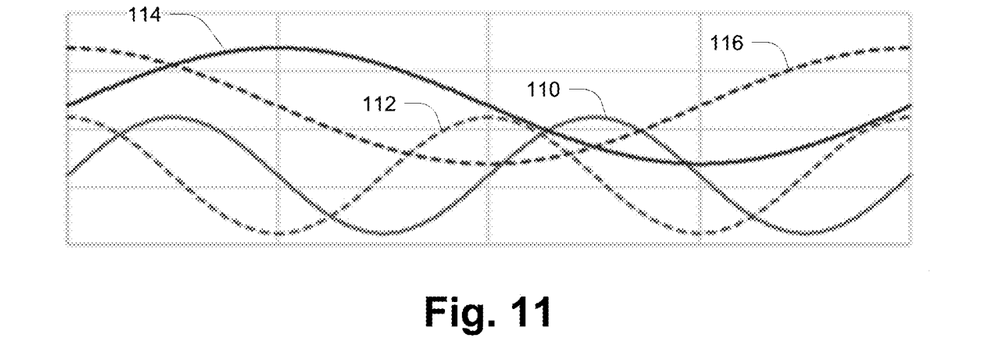
FIG. 11 is a plot of outputs generated in an optical encoder according to FIG. 9 or 10.

FIG. 11 illustrates output signals in the arrangements of FIGS. 9 and 10 as follows:

110—Sine of polarizer
112—Cosine of polarizer
114—Sine of gradient
116—Cosine of gradient Since the sensed variation is roughly sinusoidal (as shown in FIG. 11), this method can be used to generate multiple bits of sector identification, making this approach suitable for providing the coarse bits needed for resolution-enhanced encoders as described herein.

An arrangement like FIG. 9 or FIG. 10 can promote a certain compactness in the design, because there is no separate track or other feature for the sector sensing. The source beam does not have to extend to such a separate track or feature, and therefore the z-dimension of the encoder may be smaller than when using a separate track or feature for sector sensing.

Figure 12A:
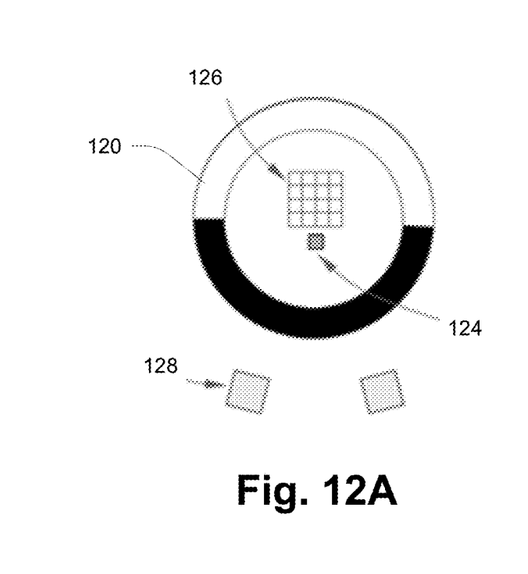
FIGS. 12A and 12B show the use of a one-bit binary track and a sinusoidally varying track respectively.
Figure 12B:
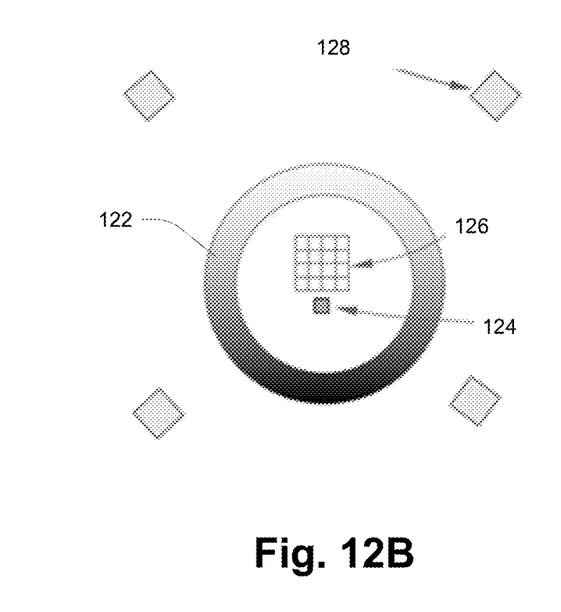
Figure 13:
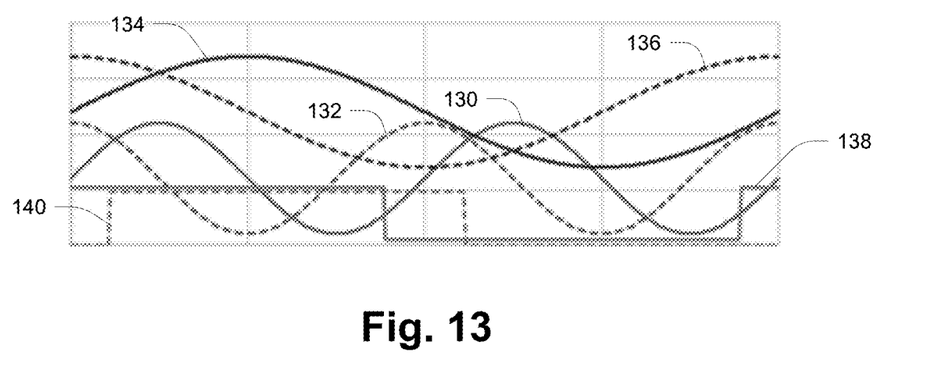
FIG. 13 is a plot of outputs generated in an optical encoder according to FIGS. 12A and 12B.

FIGS. 12A-13 illustrate an arrangement using a sinusoidal sector sensor (or "coarse track"). FIG. 12A shows a one-bit track 120 with binary reflectivity (half highly reflective and half highly non-reflective). FIG. 12B shows an alternative employing a coarse track 122 with sinusoidally varying reflectivity. Each of these also includes a respective source 124, polarization detector array 126, and photodiodes 128 (2 or 4 as shown) for sensing reflection from the coarse track 120 or 122 respectively.

Use of a track 122 of sinusoidally varying reflectivity around the full 360 degrees, instead of a binary one-bit track (120), can provide for deriving more bits for distinguishing between more cycles per revolution than two. The track 122 can be formed for example by using a laser to write a varying density of lines or dots. It could also be formed as a varying transmission pattern by using, for example, a graded chrome density or fine pattern of lines or dots. As an alternative, a track of sinusoidally varying radial width could be used, either in reflection or transmission. Alternatively, a track with a varying diffractive pattern could be used to deflect or focus light so that less or more light falls on the photodiodes, generating sinusoidal signals.

FIG. 13 illustrates output signals in the arrangements of FIGS. 12A and 12B as follows:
- 130—Sine of polarizer
- 132—Cosine of polarizer
- 134—Sine of sinusoidal track
- 136—Cosine of sinusoidal track
- 138—Binary lead
- 140—Binary lag Part 3—Applications—Sector Sensing This part describes techniques for resolving large-scale position or sector as explained above, e.g., to a half-circle or quadrant, to supplement the output of a polarization sensor which typically repeats every 180 degrees.

One possibility is to use a capacitance sensor (or multiple capacitance sensors) to detect the presence of a one-bit binary track; e.g., metal deposited pattern on polarizer or retarder.

Figure 14A:
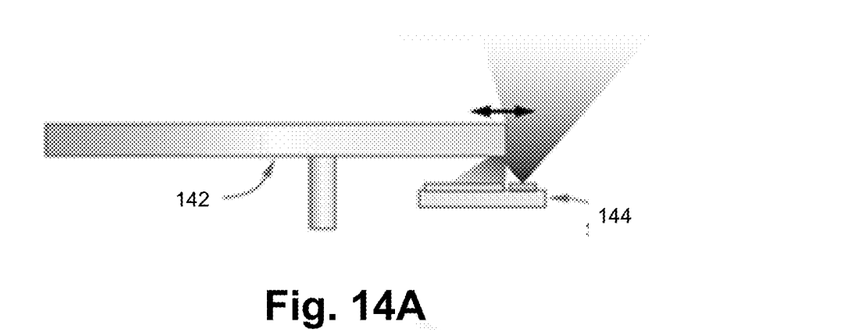
FIGS. 14A and 14B show arrangements employing eccentric features for sector sensing.
Figure 14B:
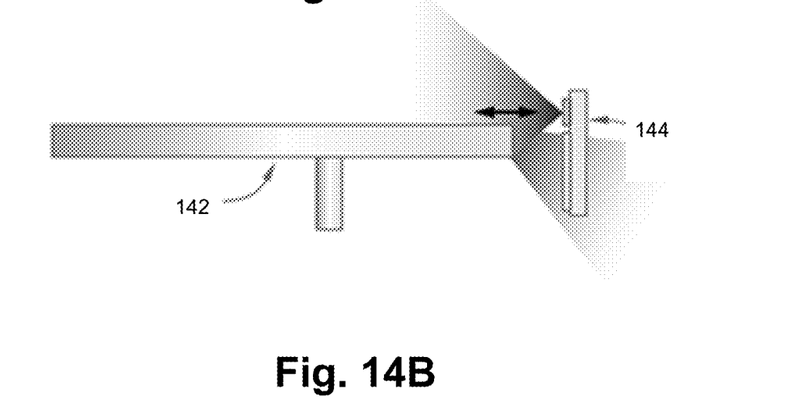

FIGS. 14A and 14B shows alternative arrangements that employ an eccentric feature 142 (e.g., disk or shaft of rotating component bearing the polarization optic) to provide sector sensing. In FIG. 14A the detector/source assembly 144 is oriented parallel to the face of the feature 142, while in FIG. 14B the detector/source assembly 144 is oriented perpendicular to the face of the feature 142.

Figure 15:
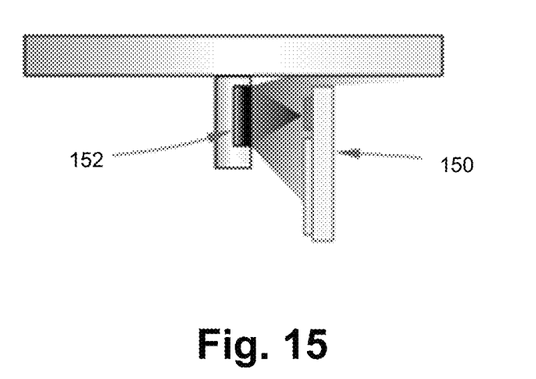
FIG. 15 shows an arrangement employing marking for sector sensing.

FIG. 15 shows an arrangement having a source/detector assembly 150 disposed opposite a marking 152 (e.g., laser marking) on a rotating feature (e.g., rotating component bearing polarization optic) for sector sensing.

Part 4—Packaging and Arrangement Alternatives

Figure 16:
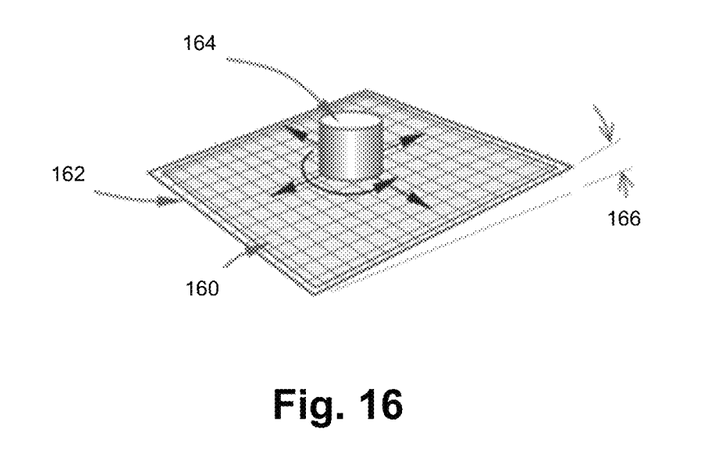
FIG. 16 is a schematic depiction of an optical encoder measuring both angular and grid (X, Y) position.

FIG. 16 shows an encoder having a rotary/linear configuration where the rotary orientation of an x, y, or z-linearly translating assembly is continuously measured. A polarizer 160 (e.g., large area sheet polarizer) on an X, Y grid scale 162 provides polarized illumination to the detectors of a translating and rotating sensor 164, the sensor being able to detect the angle of polarization over the full translation range. A reflective arrangement is shown; it may also be realized in a transmissive arrangement. This encoder may be suited for an X, Y, Oz encoder wherein, to minimize z-height, abbe errors, and other errors related to stacking axes, it is beneficial to read X and Y (as a grid encoder) and Oz from the same plane. It is also tolerant of minor tilts 166 of the plane being observed.

In another arrangement a set of polarization encoders can be used in closely spaced multi-axis configuration where all axes are on-axis, all are off-axis, or there is a mix of on and off-axis (the encoder can be used on axis or off-axis without any change to the encoder sensor).

Figure 17:
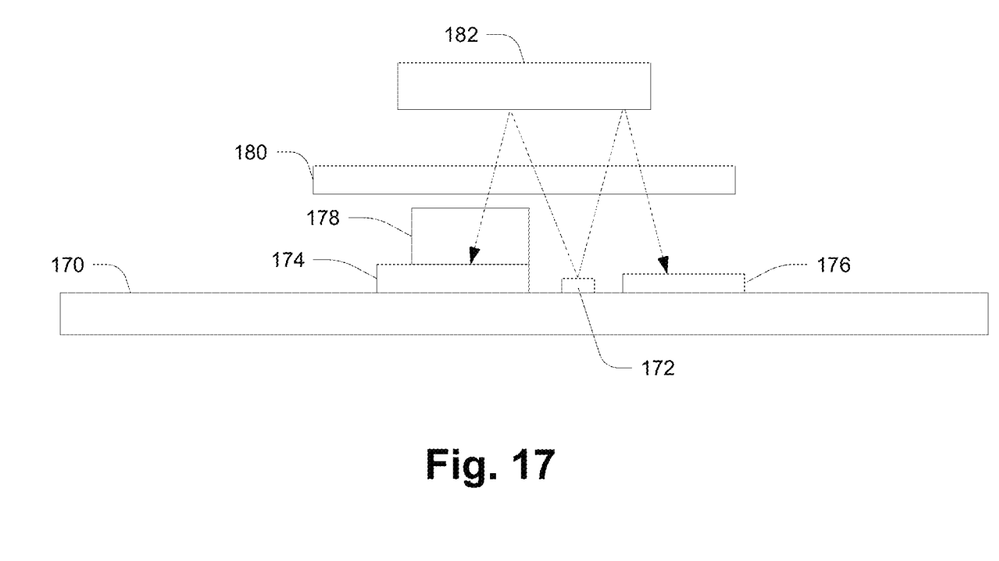
FIG. 17 is a schematic side view of an optical encoder arrangement in which a single light source provides beams for polarization sensing as well as sector sensing.

In one general arrangement, a single light source is used to illuminate both the polarization components as well as the sector sensor (e.g., one-bit track). FIG. 17 is a side view showing a substrate 170, source 172, polarization detector 174 and photodiode (sector sensor) 176, polarizer array 178, window 180, and rotating polarizer 182.

FIG. 17 illustrates a particular optical sensing configuration with a polarizer array 178 bonded to the polarization detector 174, and the polarizer 182 and photodiodes 176 in close proximity to minimize crosstalk. The polarizer array 178 can be realized as a glass substrate with a wire grid polarizer array on the bottom (with a protective coating) and an anti-reflective coating at the top.

A reflective polarizer used as a rotating target may be realized using a nanoparticle polarizer with reflective coating on the back side. An alternative approach is to use a polarizing wire grid in reflection.

While various embodiments of the invention have been particularly shown and described, it will be understood by those skilled in the art that various changes in form and details may be made therein without departing from the scope of the invention as defined by the appended claims.

What is claimed is:

1. A rotary optical position encoder for measuring rotational position of a rotating component, comprising:
   a source of a non-collimated linear-polarized light beam;
   a polarization-sensitive detector;
   a rotating retarder affixed to the rotating component for rotation therewith, the retarder being disposed for rotation along a path of the non-collimated linear-polarized light beam from the source to the detector, the retarder being configured and operative to produce a polarized exit beam portion whose polarization state rotates at a rate greater than a rotation rate of the retarder; and
   processing circuitry configured and operative to receive and process an output from the detector to generate an encoder output indicative of the rotational position of the rotating component,
   wherein the polarization-sensitive detector provides full position information over each of a plurality of sectors of revolution of the retarder, and further including a sector sensor configured and operative to produce additional position information distinguishing among the sectors of revolution of the retarder during operation.

2. The rotary optical position encoder of claim 1, wherein the rotating retarder is a half-wave retarder producing the exit beam portion with a polarization state rotation rate twice the rotation rate of the retarder.

3. The rotary optical position encoder of claim 1, wherein the retarder is a transmissive retarder interacting with the non-collimated polarized light beam once as the light beam travels through the retarder.

4. The rotary optical position encoder of claim 1, wherein the retarder is used in reflection and interacts with the non-collimated polarized light beam once as an incident beam passing through the retarder and then a second time as a reflected beam passing back through the retarder, the two interactions providing the polarization state rotation of the exit beam portion.

5. The rotary optical position encoder of claim 4, wherein the source and detector are co-located on a planar substrate facing the retarder.

6. The rotary optical position encoder of claim 5, wherein the sector sensor includes (1) a sector-identifying aspect of the retarder, being illuminated by the incident beam and producing a reflected sector sensor beam, and (2) a sector sensor detector on the planar substrate configured to receive the sector sensor beam and produce a corresponding sector sensor output distinguishing among the sectors of revolution of the retarder during operation.

7. The rotary optical position encoder of claim 4, wherein the rotating retarder is a quarter-wave retarder producing the exit beam portion with a polarization state rotation rate twice the rotation rate of the retarder.

8. The rotary optical position encoder of claim 1, wherein the rotating retarder is one of a series of retarders disposed along the path of the light beam between the source and the detector.

9. The rotary optical position encoder of claim 8, wherein the rotating retarder is a transmissive retarder and is followed by a stationary reflective retarder.

10. The rotary optical position encoder of claim 1, employing multiple sources of respective non-collimated linear-polarized beams of different polarization, the beams traveling along respective paths to the detector via the retarder, and wherein the processing circuitry is further configured and operative to combine respective detector outputs of the detector to produce the encoder output.

11. The rotary optical position encoder of claim 1, wherein the sector sensor is integrated at least partly with the detector and retarder.

12. The rotary optical position encoder of claim 11, wherein the retarder has a graded variation of a transmission or reflection characteristic in a pattern providing for sector identification.

13. The rotary optical position encoder of claim 12, wherein the graded variation of transmission or reflection characteristic is linear along an optical axis of the retarder, producing a substantially sinusoidal intensity variation of the polarized exit beam portion in a cycle of rotation of the retarder.

14. The rotary optical position encoder of claim 13, wherein the detector includes individual addressable detector elements for sensing the sinusoidal intensity variation of the polarized exit beam portion.

15. The rotary optical position encoder of claim 12, wherein the graded variation of transmission or reflection characteristic has sinusoidal variation in a ring-like pattern about an optical axis of the retarder.

16. The rotary optical position encoder of claim 1, wherein the sector sensor includes structure at least partially separate from the detector and retarder.

17. The rotary optical position encoder of claim 16, wherein the sector sensor includes an eccentric feature having an eccentric rotational pattern detected to distinguish among the sectors.

18. The rotary optical position encoder of claim 17, wherein the eccentric feature is formed by an eccentric aspect of the rotating component bearing the retarder.

19. The rotary optical position encoder of claim 16, wherein the sector sensor includes marking of the rotating component and corresponding sensing of the marking.

20. The rotary optical position encoder of claim 19, wherein the marked rotating component is a rotating shaft to which the retarder is affixed.

21. The rotary optical position encoder of claim 1, wherein the non-collimated polarized light beam from the source is used for both polarization detection by the detector and sector sensing by the sector sensor.

22. The rotary optical position encoder of claim 1, wherein the source and detector are co-located on a substrate.

23. The rotary optical position encoder of claim 1, wherein the polarization-sensitive detector includes multiple separate regions, each region having a respective multi-phase set of polarizers and detectors with one polarizer and one detector for each of a plurality of distinct phases, and wherein respective-phase outputs of the regions are summed together to provide spatial averaging and corresponding noise tolerance.

24. The rotary optical position encoder of claim 23, wherein each multi-phase set has four polarizers and four detectors in a quadrature arrangement.

25. The rotary optical position encoder of claim 24, wherein the number of regions is four.

* * * * *